(12) United States Patent
Brown et al.

(10) Patent No.: US 10,011,230 B1
(45) Date of Patent: Jul. 3, 2018

(54) VEHICLE SURVEILLANCE SYSTEM

(71) Applicants: Odain Brown, Irvington, NJ (US);
Sabrina Brown, Irvington, NJ (US)

(72) Inventors: Odain Brown, Irvington, NJ (US);
Sabrina Brown, Irvington, NJ (US)

( * ) Notice: Subject to any disclaimer, the term of this patent is extended or adjusted under 35 U.S.C. 154(b) by 336 days.

(21) Appl. No.: 14/810,668

(22) Filed: Jul. 28, 2015

(51) Int. Cl.
| *B60R 1/00* | (2006.01) |
| *G06K 9/00* | (2006.01) |
| *H04N 5/00* | (2011.01) |
| *H04N 7/18* | (2006.01) |
| *H04N 5/225* | (2006.01) |

(52) U.S. Cl.
CPC .......... *B60R 1/002* (2013.01); *G06K 9/00771* (2013.01); *H04N 5/2252* (2013.01); *H04N 7/181* (2013.01); *B60R 2300/102* (2013.01); *B60R 2300/105* (2013.01); *B60R 2300/404* (2013.01); *B60R 2300/8073* (2013.01)

(58) Field of Classification Search
None
See application file for complete search history.

(56) References Cited

U.S. PATENT DOCUMENTS

| 4,420,238 | A | | 12/1983 | Felix | |
| 4,949,186 | A | | 8/1990 | Peterson | |
| 4,955,835 | A | * | 9/1990 | Hollingsworth | .... B63B 35/7933 |
| | | | | | 114/174 |
| 5,540,478 | A | * | 7/1996 | Schuch | ...................... B60J 7/04 |
| | | | | | 224/331 |
| 5,793,420 | A | | 8/1998 | Schmidt | |
| 5,863,209 | A | * | 1/1999 | Kim | ......................... G09B 5/02 |
| | | | | | 348/373 |
| 6,141,034 | A | * | 10/2000 | McCutchen | ........... G02B 27/22 |
| | | | | | 348/36 |
| 6,333,759 | B1 | | 12/2001 | Mazzilli | |
| D624,106 | S | | 9/2010 | Cho | |
| 2003/0020840 | A1 | * | 1/2003 | Hays | ...................... H04N 5/268 |
| | | | | | 348/837 |
| 2003/0202097 | A1 | * | 10/2003 | Kallhammer | ............. B60R 1/00 |
| | | | | | 348/148 |
| 2004/0150717 | A1 | | 8/2004 | Page | |
| 2004/0155477 | A1 | * | 8/2004 | Lanigan | ............. B62D 33/0222 |
| | | | | | 296/50 |
| 2005/0231593 | A1 | | 10/2005 | Arant | |
| 2008/0110189 | A1 | * | 5/2008 | Alston | ............... B60H 1/00428 |
| | | | | | 62/236 |

(Continued)

FOREIGN PATENT DOCUMENTS

CN            103879351 A      6/2014

*Primary Examiner* — Edemio Navas, Jr.
(74) *Attorney, Agent, or Firm* — Kyle A. Fletcher, Esq.

(57) ABSTRACT

The vehicle surveillance system is installed in a vehicle and includes a camera housing that is positioned at a topmost surface of the vehicle. The camera housing includes a plurality of cameras that are directed at differing angles with respect to one another. The plurality of cameras are directed away from the camera housing in order to provide a full 360 degrees of video footage around the vehicle. The camera housing is slideably engaged with respect to a second housing that is affixed to the vehicle. A rack-and-pinion gearing system enables the camera housing to extend and retract vertically with respect to the second housing. The plurality of cameras is wired to a video recording member that is located elsewhere with respect to said vehicle.

11 Claims, 5 Drawing Sheets

(56) References Cited

U.S. PATENT DOCUMENTS

| | | | |
|---|---|---|---|
| 2010/0141736 A1* | 6/2010 | Hack | G01C 11/00 348/36 |
| 2012/0140080 A1* | 6/2012 | Taylor | B60C 23/0408 348/148 |
| 2012/0236112 A1* | 9/2012 | Cilia | B60R 11/04 348/36 |
| 2013/0250047 A1* | 9/2013 | Hollinger | H04N 5/2252 348/36 |
| 2014/0347440 A1* | 11/2014 | Hatcher | B60R 11/04 348/36 |
| 2015/0180178 A1* | 6/2015 | Ranka | B60R 9/058 403/299 |

\* cited by examiner

VEHICLE SURVEILLANCE SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of surveillances, more specifically, a surveillance system that is specially adapted for use with vehicles.

Vehicular security systems have been around for a long time, and simply emit an audible alarm when a car is being broken into. However, these alarms do not take video footage of the person or persons breaking into the vehicle. What is needed, and what is accomplished in this disclosure is a surveillance system that works in concert with or alone of an alarm in order to take video footage of a car thief in action or another motorist scratching or denting the car while parked, and which may be used in a criminal or civil proceeding there after.

SUMMARY OF THE INVENTION

The vehicle surveillance system is installed in a vehicle surface of the vehicle. The camera housing includes a plurality of cameras that are directed at differing angles with respect to one another. The plurality of cameras are directed away from the camera housing in order to provide a full 360 degrees of video footage around the vehicle. The camera housing is slideably engaged with respect to a second housing that is affixed to the vehicle. A rack-and-pinion gearing system enables the camera housing to extend and retract vertically with respect to the second housing. The plurality of cameras is wired to a video recording member that is located elsewhere with respect to said vehicle. The video recording member is also wired to a central processing unit that is wired to the vehicle's electrical system as well as a transceiver that enables wireless communication with the vehicle surveillance system.

It is an object of the invention to provide a surveillance system that works to provide 360 degrees of video footage around a vehicle.

A further object of the invention is to provide a camera housing that extends upwardly from a topmost surface of the vehicle in order for the plurality of cameras to provide video footage.

A further object of the invention is to provide a surveillance system that works alone or in concert with a vehicle alarm system.

These together with additional objects, features and advantages of the vehicle surveillance system will be readily apparent to those of ordinary skill in the art upon reading the following detailed description of presently preferred, but nonetheless illustrative, embodiments of the vehicle surveillance system when taken in conjunction with the accompanying drawings.

In this respect, before explaining the current embodiments of the vehicle surveillance system in detail, it is to be understood that the vehicle surveillance system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle surveillance system.

It is therefore important that the claims be regarded as including such equivalent construction insofar as they do not depart from the spirit and scope of the vehicle surveillance system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
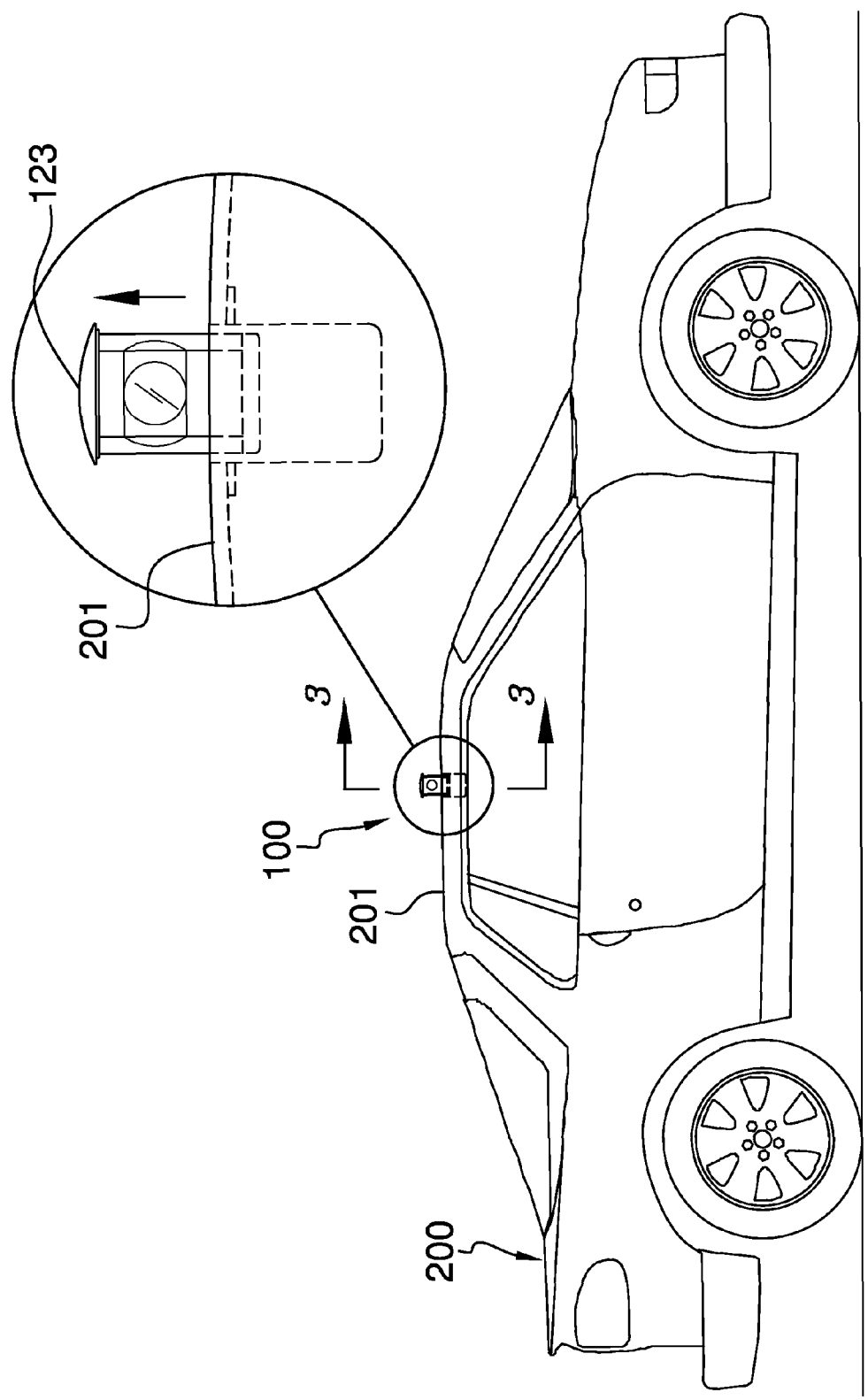
FIG. 1 is a front view of an embodiment of the disclosure.
Figure 2:
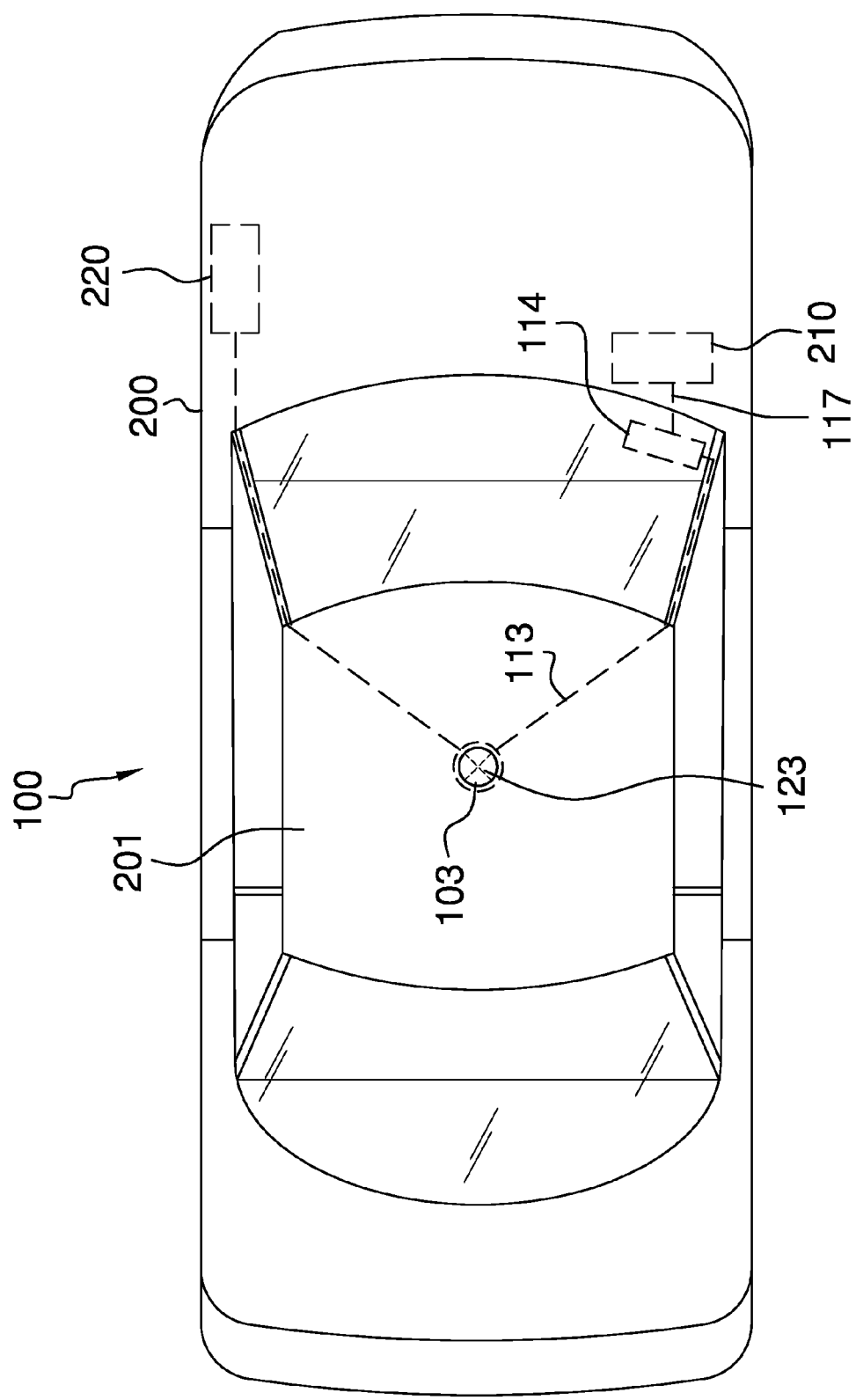
FIG. 2 is a top view of an embodiment of the disclosure.
Figure 3:
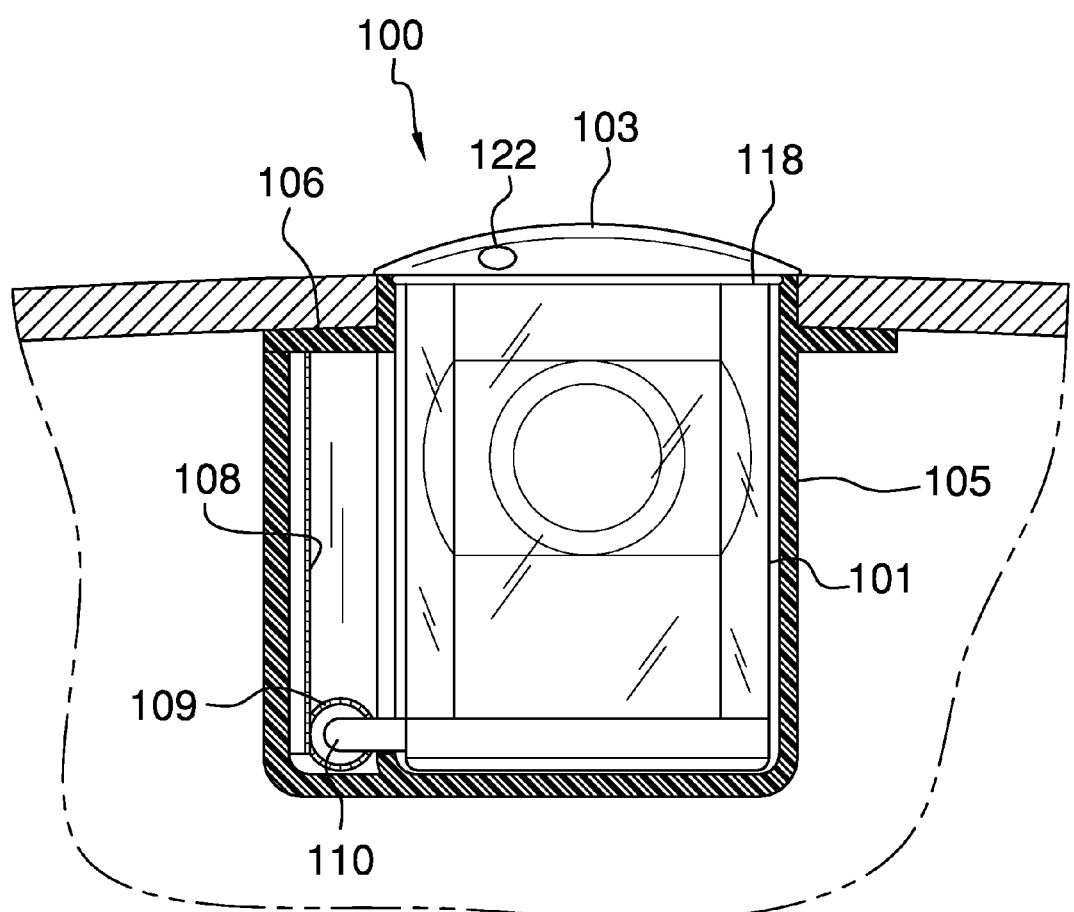
FIG. 3 is a cross-sectional view of an embodiment of the disclosure along line 3-3 in FIG. 1.
Figure 4:
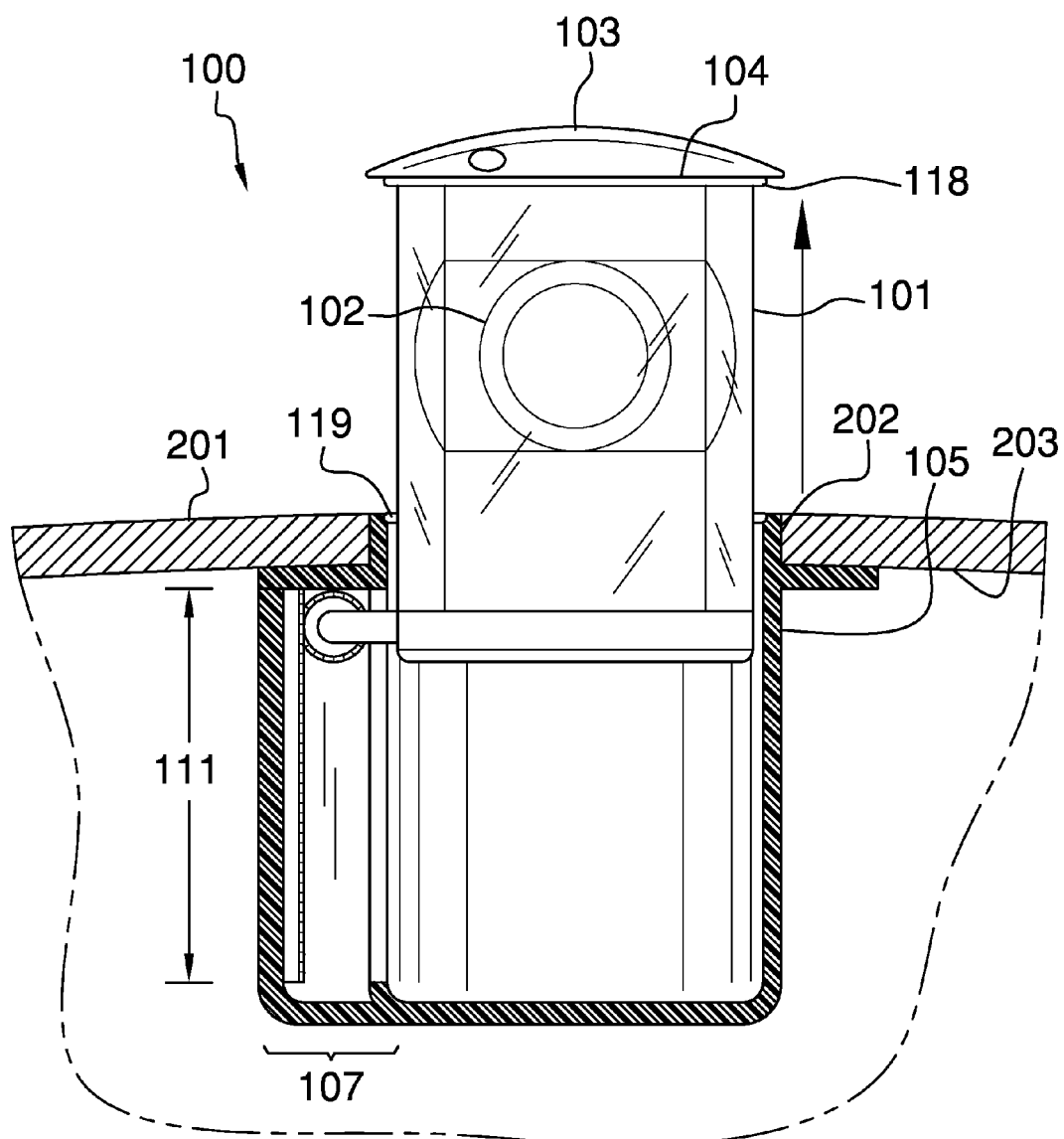
FIG. 4 is a second cross-sectional view of an embodiment of the disclosure along line 3-3 in FIG. 1.
Figure 5:
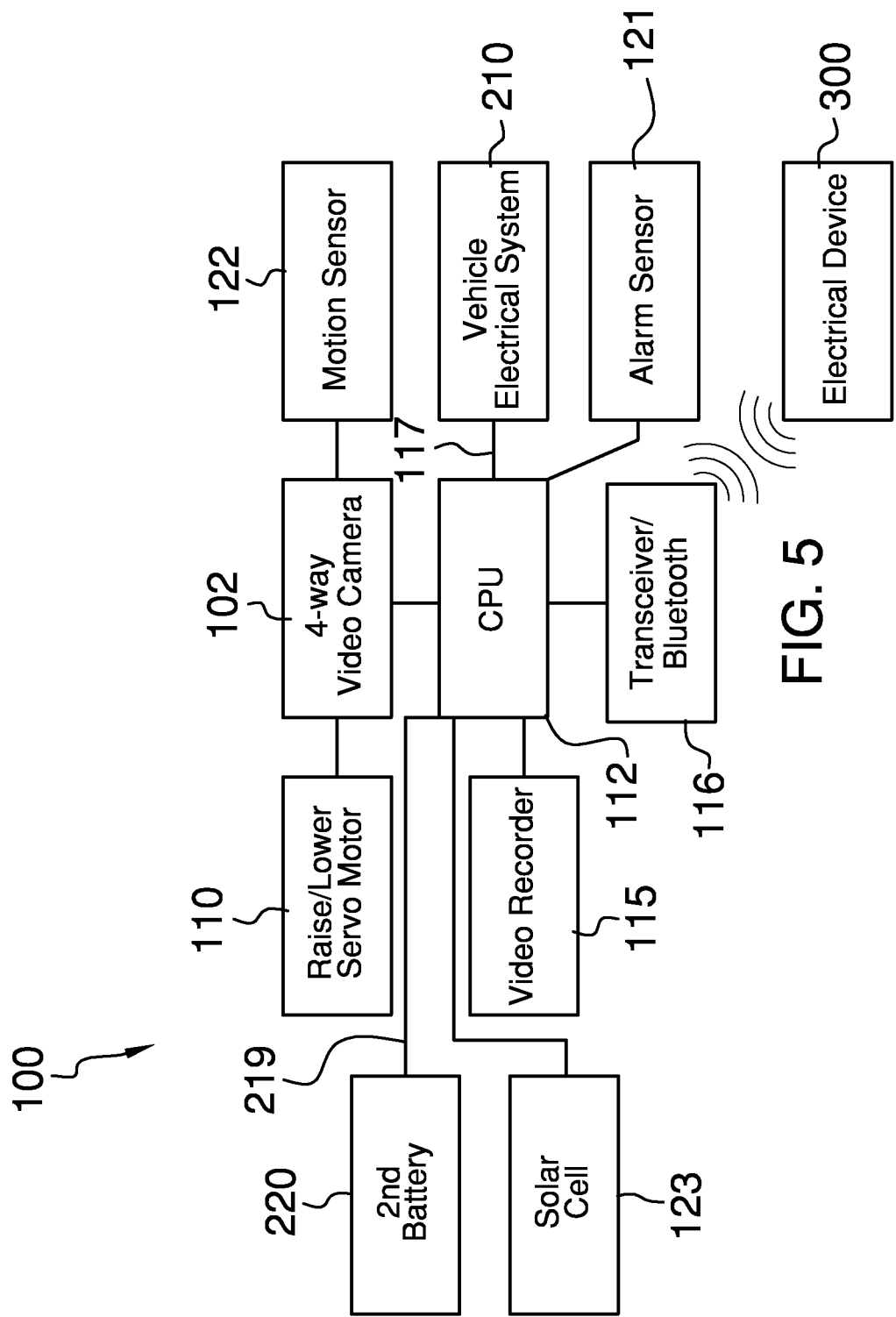
FIG. 5 is a block diagram of an embodiment of the disclosure.

As best illustrated in FIGS. 1 through 5, the vehicle surveillance system 100 (hereinafter invention) generally comprises a camera housing 101 that includes a plurality of cameras 102 mounted therein. The camera housing 101 is made of a translucent material, and is polygonally-shaped. Moreover, the plurality of cameras 102 is each directed outwardly with respect to the camera housing 101. Each of the plurality of cameras 102 is oriented at a different direction with respect to one another in order to provide a 360-degree of video coverage. Moreover, each of the plurality of cameras 102 is directed at an equal direction with respect to one another.

The camera housing 101 includes a top cover 103 that is positioned at a top edge 104 of the camera housing 101. The top cover 103 has a convexed shape. The top cover 103 may include a solar cell 123 thereon, which is able to produce electricity that is used via the invention 100. Both the camera housing 101 and the top cover 103 are able to extend and retract with respect to a second housing 105. The second housing 105 is adapted to be rigidly affixed to a vehicle 200. More specifically, the vehicle 200 has a topmost surface 201 into which an opening 202 is formed. The second housing 105 is affixed to the opening 202. The second housing 105 is further defined with a shoulder 106 that is adapted to interface with an inner surface 203 adjacent to the opening 202 of the vehicle 200.

The second housing 105 includes a gearing portion 107 that houses a rack 108 and pinion 109 therein. The rack 108 enables the pinion 109 to raise and lower the camera housing 101 with respect to the second housing 105. The pinion 109 is affixed to a motor 110 that in turn is rigidly affixed to the camera housing 101. The pinion 109 is able to roll up and down a rack length 111 of the rack 108.

The plurality of cameras 102 is wired to a central processing unit 112 located elsewhere with respect to the vehicle 200. Furthermore, a camera wire 113 connects the plurality of cameras 102 to the central processing unit 112. The central processing unit 112 is housed within a third housing 114, which is located elsewhere with respect to the plurality of cameras 102. The third housing 114 includes a memory unit 115 that is wired to the central processing unit 112. The memory unit 115 stores video footage taken from the plurality of cameras 102. The third housing 114 also includes a transceiver 116 that is wired to the central processing unit 112. The transceiver 116 enables wireless communication between the invention 100 and an electrical device 300.

The transceiver 116 may utilize a Bluetooth technology or other wireless telecommunication system to provide communication between the invention 100 and the electrical device 300. The term electrical device 300 is being used to refer to a computer or smart phone. The central processing unit 112 is adapted to be wired to a vehicle battery 210 of the vehicle 200. Moreover, a power wire 117 extends from the central processing unit 112 to the vehicle battery 210. The invention 100 draws electricity from the vehicle battery 210 of the vehicle 200.

The invention 100 may include a second battery 220 that is located in the vehicle 200. The second battery 220 works to operate the invention 100 when the vehicle 200 is turned off. The second battery 220 may work in concert with the vehicle battery 210 and/or the solar cell 123 to collectively provide electricity for the invention 100.

The top edge 104 of the camera housing 101 includes a gasket 118, which is located under the top cover 104. The gasket 118 forms a watertight seal between the top cover 103 and a second top edge 119 of the second housing 105. The camera wire 113 also connects the motor 110 to the central processing unit 112.

The central processing unit 112 may be wired to an alarm sensor 121, which may be a part of a car alarm. Moreover, the central processing unit 112 may be programmed to turn on or off autonomously or at the command of the electrical device 300 via the transceiver 116. Alternatively, a motion sensor 122 may be provided on the camera housing 101 and wired to the central processing unit 112 via the camera wire 113. The motion sensor 122 would commence use of the plurality of cameras 102 upon detection of motion within a predefined range of distance of the vehicle 200. It shall be noted that the invention 100 may be turned on to operate 24 hours a day.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle surveillance system comprising:
   a camera housing that supports a plurality of cameras therein;
   wherein the camera housing extends and retracts from within a second housing;
   wherein the second housing and the camera housing are adapted to be positioned at a topmost surface of a vehicle such that the plurality of cameras is able to capture a 360-degree area of footage in order to record a criminal or tort against said vehicle;
   wherein the camera housing is made of a translucent material, and is polygonally-shaped;
   wherein the plurality of cameras is each directed outwardly with respect to the camera housing;
   wherein each of the plurality of cameras is oriented at a different direction with respect to one another;
   wherein each of the plurality of cameras is directed at an equal direction with respect to one another;
   wherein the camera housing includes a top cover that is positioned at a top edge of the camera housing;
   wherein the top cover has a convexed shape;
   wherein both the camera housing and the top cover are able to extend and retract with respect to the second housing;
   wherein the top cover includes at least one solar cell thereon;
   wherein the second housing is adapted to be rigidly affixed to the vehicle;
   wherein an opening is provided on the topmost surface of the vehicle;
   wherein the second housing is adapted to be affixed to the opening;
   wherein the second housing is further defined with a shoulder that is adapted to interface with an inner surface adjacent to the opening of the vehicle;
   wherein the top edge of the camera housing includes a gasket, which is located under the top cover;
   wherein the gasket forms a watertight seal between the top cover and a second top edge of the second housing;
   wherein the second housing includes a gearing portion that houses a rack and pinion therein.

2. The vehicle surveillance system according to claim 1 wherein the rack enables the pinion to raise and lower the camera housing with respect to the second housing.

3. The vehicle surveillance system according to claim 2 wherein the pinion is affixed to a motor that in turn is rigidly affixed to the camera housing.

4. The vehicle surveillance system according to claim 3 wherein the pinion is able to roll up and down a rack length of the rack, thereby extending the camera housing up and down from within the second housing.

5. The vehicle surveillance system according to claim 4 wherein the plurality of cameras is wired to a central processing unit located elsewhere with respect to the vehicle; wherein the at least one solar cell is wired to the central processing unit in order to provide electricity to the central processing unit that is generated via the at least one solar cell provided on the top cover.

6. The vehicle surveillance system according to claim 5 wherein a camera wire connects the plurality of cameras to the central processing unit; wherein the central processing unit is housed within a third housing, which is located elsewhere with respect to the plurality of cameras; wherein the camera wire also connects the motor to the central processing unit.

7. The vehicle surveillance system according to claim 6 wherein the third housing includes a memory unit that is wired to the central processing unit; wherein the memory unit stores video footage taken from the plurality of cameras.

8. The vehicle surveillance system according to claim 7 wherein the third housing also includes a transceiver that is wired to the central processing unit; wherein the transceiver enables wireless communication between the central processing unit and an electrical device.

9. The vehicle surveillance system according to claim 8 wherein the central processing unit is adapted to be wired to a vehicle battery of the vehicle; wherein a power wire extends from the central processing unit to the vehicle battery; wherein a second battery is located in the vehicle, and is wired to the central processing unit; wherein the second battery is used to provide electricity when the vehicle is turned off and the vehicle battery is not available.

10. The vehicle surveillance system according to claim 9 wherein the central processing unit is wired to an alarm sensor, which communicates with a car alarm of said vehicle; wherein the central processing unit is programmed to turn on or off autonomously or at the command of the electrical device via the transceiver.

11. The vehicle surveillance system according to claim 9 wherein a motion sensor is provided on the camera housing and wired to the central processing unit via the camera wire; wherein the motion sensor commences use of the plurality of cameras upon detection of motion within a predefined range of distance of the vehicle.

* * * * *